US012601439B2

(12) United States Patent     (10) Patent No.:    US 12,601,439 B2

Iacopetta                        (45) Date of Patent:      Apr. 14, 2026

(54) FITTING WITH RING NUT FOR FIXING A BRANCH PIPE OF AN IRRIGATION SYSTEM

(71) Applicant: TECO S.R.L., Trani (IT)

(72) Inventor: Cosimo Iacopetta, Bisceglie (IT)

(73) Assignee: TECO S.R.L., Trani (IT)

( * ) Notice: Subject to any disclaimer, the term of this patent is extended or adjusted under 35 U.S.C. 154(b) by 156 days.

(21) Appl. No.: 17/328,188

(22) Filed: May 24, 2021

(65) Prior Publication Data

US 2021/0364114 A1     Nov. 25, 2021

(30) Foreign Application Priority Data

May 25, 2020    (IT) ........................ 102020000012247

(51) Int. Cl.
     *F16L 41/14*        (2006.01)
(52) U.S. Cl.
     CPC .................................... *F16L 41/14* (2013.01)
(58) Field of Classification Search
     CPC .......... F16L 41/14; F16L 19/045; F16L 19/06
     See application file for complete search history.

(56) References Cited

U.S. PATENT DOCUMENTS

| | | | | | |
|---|---|---|---|---|---|
| 1,790,025 | A | * | 1/1931 | Schnaier | F16L 19/045 |
| | | | | | 285/334.5 |
| 2,396,163 | A | * | 3/1946 | Dies | F16L 19/06 |
| | | | | | 285/133.11 |

| | | | | | |
|---|---|---|---|---|---|
| 2,406,478 | A | * | 8/1946 | Snyder | F16L 19/045 |
| | | | | | 285/341 |
| 2,496,510 | A | * | 2/1950 | Wolfram | F16L 19/045 |
| | | | | | 285/341 |
| 2,544,108 | A | * | 3/1951 | Richardson | F16L 19/045 |
| | | | | | 285/341 |
| 2,737,403 | A | * | 3/1956 | Ellis | F16L 19/045 |
| | | | | | 285/341 |
| 2,862,732 | A | * | 12/1958 | Guillou | F16L 19/06 |
| | | | | | 29/520 |
| 3,294,426 | A | * | 12/1966 | Lyon | F16L 19/045 |
| | | | | | 285/341 |
| 3,379,461 | A | * | 4/1968 | Davis | F16L 19/06 |
| | | | | | 285/341 |
| 3,970,336 | A | * | 7/1976 | O'Sickey | F16L 19/045 |
| | | | | | 285/341 |
| 5,263,794 | A | * | 11/1993 | Webb | F16L 19/06 |
| | | | | | 405/129.55 |
| 2009/0208271 | A1 | * | 8/2009 | Krohn | F16L 41/14 |
| | | | | | 403/4 |

(Continued)

FOREIGN PATENT DOCUMENTS

| | | | | | |
|---|---|---|---|---|---|
| DE | 202009007943 U1 | * | 9/2009 | ............ | F16L 19/045 |
| EP | 2 748 508 B1 | | 6/2017 | | |

(Continued)

*Primary Examiner* — Matthew Troutman
*Assistant Examiner* — Fannie Kee
(74) *Attorney, Agent, or Firm* — FisherBroyles, LLP; Roger L. Browdy; James E. Mrose

(57)              ABSTRACT

An internally hollow fitting for the passage of a liquid, in particular water, with a component to restrain unmovably a pipe of an irrigation system, wherein the restraining component of the pipe is carried by a ring nut screwing on an external thread of the at least one end of the fitting.

6 Claims, 5 Drawing Sheets

(56)  References Cited

U.S. PATENT DOCUMENTS

| | | | | |
|---|---|---|---|---|
| 2010/0059996 | A1 * | 3/2010 | Ciprich | F16L 19/045 |
| | | | | 285/342 |
| 2012/0161433 | A1 * | 6/2012 | Magargal | F16L 41/14 |
| | | | | 239/200 |
| 2021/0348707 | A1 | 11/2021 | Iacopetta | |

FOREIGN PATENT DOCUMENTS

| | | | | | |
|---|---|---|---|---|---|
| EP | 3 906 778 | A1 | | 11/2021 | |
| IT | 1049086 | B | * | 1/1981 | F16L 19/045 |
| KR | 200159594 | Y1 | * | 10/1999 | F16L 19/06 |
| KR | 200302170 | Y1 | * | 1/2003 | F16L 19/06 |
| KR | 200339770 | Y1 | * | 1/2004 | F16L 19/06 |
| KR | 100772712 | B1 | * | 11/2007 | F16L 19/045 |

* cited by examiner

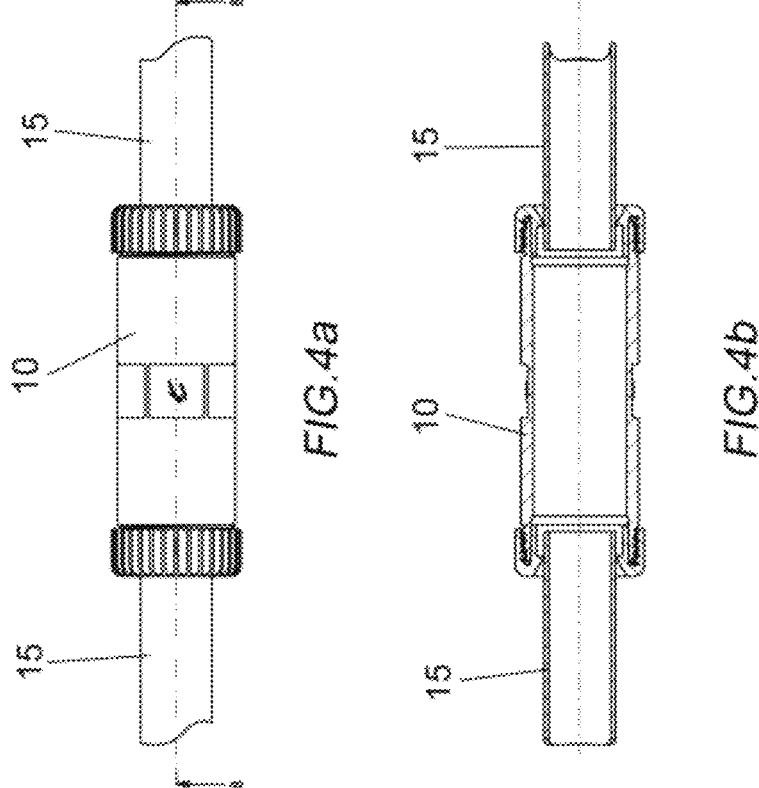

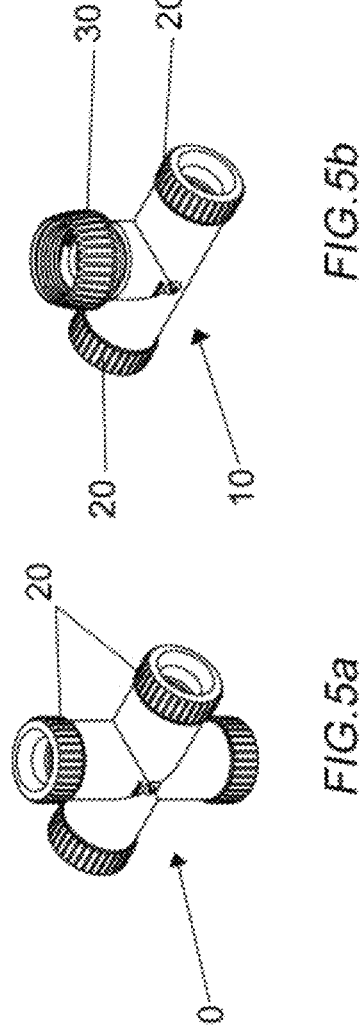
FIG.5a
FIG.5b
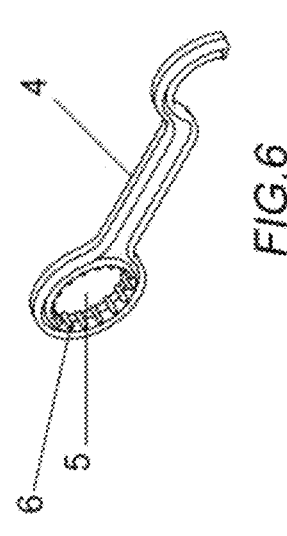
FIG.6

FITTING WITH RING NUT FOR FIXING A BRANCH PIPE OF AN IRRIGATION SYSTEM

BACKGROUND OF THE INVENTION

Field of the Invention

The present invention relates to a fitting with ring nut for fixing a pipe, for example a branch pipe, of an irrigation system.

Description of the Related Art

As is known, an irrigation system, for example, but not only, for vegetable crops such as tomatoes, peppers, lettuce, etc., or for gardening, such as plants and flowers in general, normally comprises a flexible or even rigid pipe of considerable size that departs from a water supply point, which may be the water network or a pipeline coming from a well or an aquifer, to which pipes of smaller diameter are connected, which run along the rows of crops to irrigate them.

Upstream of at least some of these pipes fitted to the main pipe shut-off valves are provided, which allow regulation of the quantity of liquid delivered by the various (groups of) dispensers and, optionally, dividing of the network into sections to be used separately, if necessary, to meet specific needs.

The system currently widespread for connecting a branch pipe to the main pipe or to any other pipe in the system consists in using one-piece fittings having at the end designed to accommodate the branch pipe a sharp internal edge designed to bite onto the pipe once inserted.

Such a solution, although valid from the point of view of tightness, has the disadvantage of being a permanent installation, in the sense that once the pipe is inserted in the fitting it remains gripped by the aforementioned sharp edge and it is not possible to remove it, for example, for maintenance or for any other reason, except by breaking the fitting.

Therefore, whenever it is necessary to remove the branch pipe, the entire fitting has to be replaced, with consequent repercussions, including economic ones.

EP2748508 A1 discloses a connecting device for flexible pipes, comprising: a supporting body, having at least one tubular portion which may be inserted into a relative flexible pipe; a seal ring, positioned around the tubular portion of the supporting body and switchable between an engaging position wherein it retains the flexible pipe on the tubular portion and a releasing position wherein it disengages the flexible pipe; and means of moving the seal ring for switching the ring between the engaging position and the releasing position; the tubular portion of the supporting body also comprises at least one protruding element, extending from the outer surface of the tubular portion along the entire transversal extension of the portion; the protruding element being interposed between two adjacent zones of the tubular portion having different transversal cross-sectional dimensions.

SUMMARY OF THE INVENTION

An object of the invention is to eliminate the disadvantages of the prior art described above.

More particularly, it is an object of the invention to provide a fitting for pipes in irrigation systems which is reusable and allows simple and fast installation.

Another object of the invention is to provide such a fitting that ensures excellent tightness on the pipe, and thus an excellent seal even in the presence of strong pressures.

Yet another object of the invention is to provide such a fitting which can be used to connect several pipes in such a way as to allow, for example, a joining between pipes, the repair of a damaged pipe or the extension of an existing pipe.

Yet another object of the invention is to provide such a fitting that is simple and economical to produce.

These and other objects of the invention are disclosed and claimed.

Substantially, the internally hollow fitting for the passage of a liquid, more particularly water, according to the invention, is provided at least one end thereof with means for immovably restraining a pipe of an irrigation system, wherein said pipe restraining means are carried by a ring nut screwed onto an external thread of said at least one end of the fitting.

Said pipe restraining means are made up of a conical section provided inside the ring nut which narrows in the direction of the fitting, resulting in a sharp edge designed to bite the pipe once inserted in the fitting, preventing the exiting thereof.

BRIEF DESCRIPTION OF THE DRAWINGS

Further features of the invention will be made clearer by the detailed description that follows, referring to its purely illustrative, and therefore non-limiting, embodiments illustrated in the accompanying drawings, wherein:

FIGS. 3a, 3b, and 4a, 4b are views similar to FIGS. 2a, 2b, showing further successive stages of fixing of the pipes to the fitting;

FIGS. 5a, 5b show by way of an example, in axonometric views, two other possible fittings with fixing ring nuts according to the invention;

FIG. 6 is an axonometric view of a possible tool or spanner that can be used to tighten the ring nut.

DESCRIPTION OF THE PREFERRED EMBODIMENTS

Referring to these drawings, a fitting with a ring nut for fixing a pipe of an irrigation system according to the invention is now described, which can assume the most varied conformations, without prejudice to the features that allow the mounting of the ring nut for the fixing of the pipe.

Figure 1A:
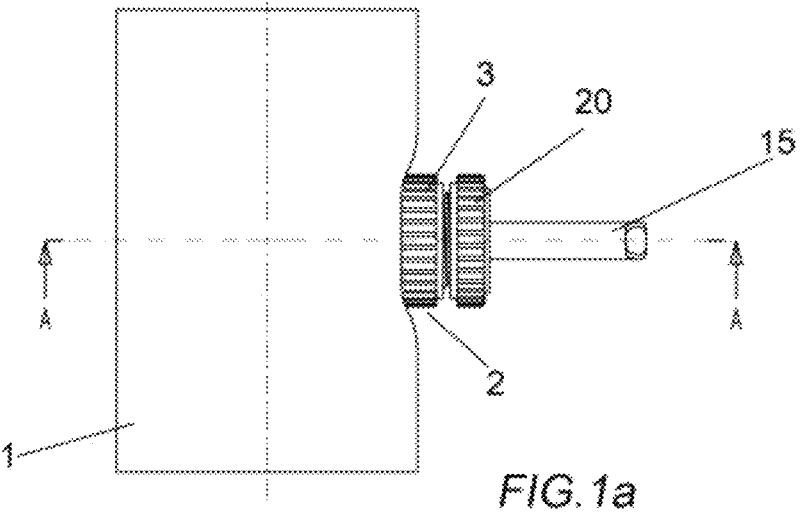
FIGS. 1a and 1b are, respectively, a plan view and a median section along line A-A of FIG. 1a of a possible fitting with fixing ring nut according to the invention mounted in a main pipe, from which a branch pipe branches off.
Figure 1B:
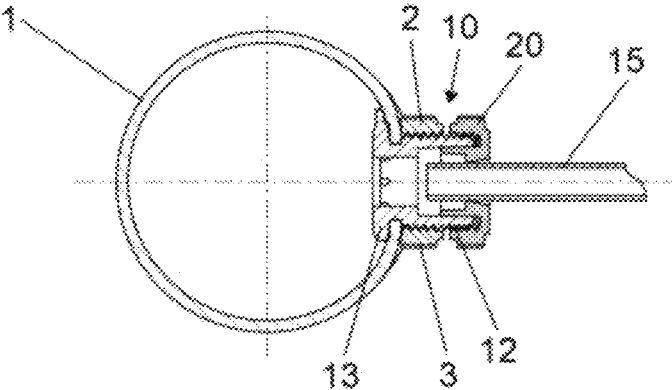

FIGS. 1a and 1b show a fitting mounted in a flexible pipe as described in Italian patent application no. 102020000009964 in the name of the same Applicant Teco srl, filed on May 5, 2020 and not yet published.

In these drawings, the flexible pipe has been denoted by reference numeral 1 and is presented in flattened form, unwound from a roll, before installation, and takes on the cylindrical shape shown in FIG. 1b after the feeding of the fluid, in particular water.

The fitting according to the invention, which will always be denoted by reference numeral 10, has a hollow tubular shape with at least one external end thread 12. In this case, the fitting 10 has a shank almost entirely externally threaded and a widened base 13 suitable for being inserted in a hole formed in the pipe 1, where it remains locked through the screwing of a ring nut 2 which is tightened on the fitting 10, for example using the tool or spanner 4 shown in FIG. 6, which has a hole 5 with internal protrusions 6 suitable for engaging an external knurling 3 of the ring nut 2.

According to the aforementioned patent application, attached to the fitting 10 is an adapter, with or without shut-off valve, for the connection of a branch pipe for the irrigation of plants by means of a series of nozzles, drippers or holes distributed along its extension.

According to the present invention, a branch pipe 15 is directly attached to the fitting 10 by means of a special ring nut 20, which will be described here below with reference also to the other drawings.

The fitting 10 shown in FIGS. 2a to 4b has a rectilinear tubular shape with both ends externally threaded 12 to accommodate respective pipes 15 fixed by means of corresponding ring nuts 20.

This fitting can be used, for example, to extend an existing pipe 15 or to repair a leaking pipe, cutting the damaged portion and joining with it the head ends of the cut pipe.

The ring nut 20 for the fixing of the pipe 15 to the fitting 10 has an internal thread 21 for screwing onto the external thread 12 of the fitting 10, and an internal tubular protrusion 22, having a slight conicity, which is placed against a bevelled or conical section 14 of the wall of the internal cavity of the fitting, resulting in an excellent seal of the ring nut on the fitting.

The mouth 23 of the tubular protrusion 22 has a conical shape which narrows in the direction of the fitting 10, resulting in a sharp edge 24 capable of biting on the pipe 15 once inserted into the fitting, preventing the exiting thereof.

Figure 2A:
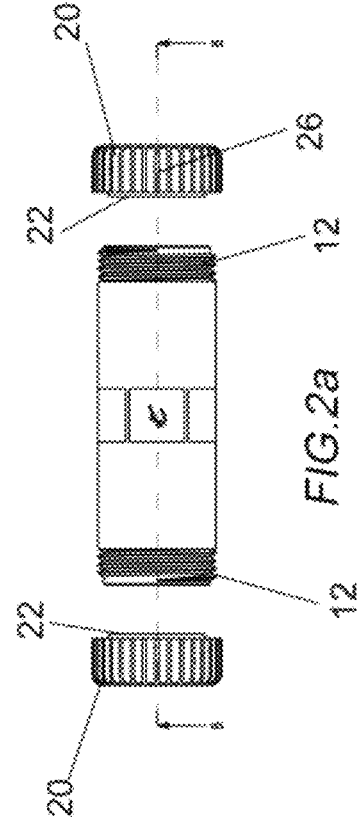
FIGS. 2a and 2b are, respectively, a plan view and a median section along line B-B of FIG. 2a of a fitting suitable for accommodating two in-line pipes.
Figure 2B:
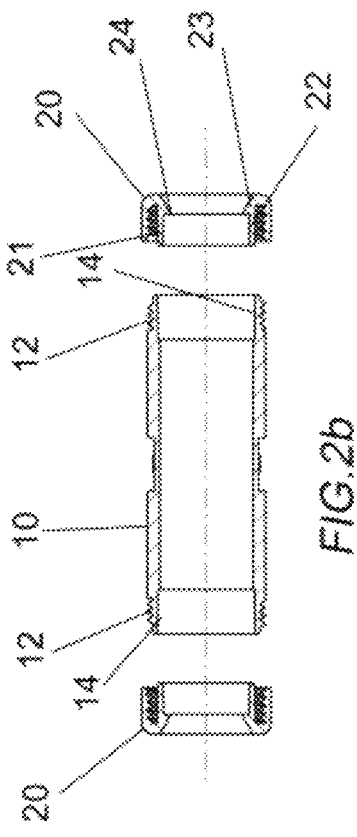
Figures 3A, 3B:
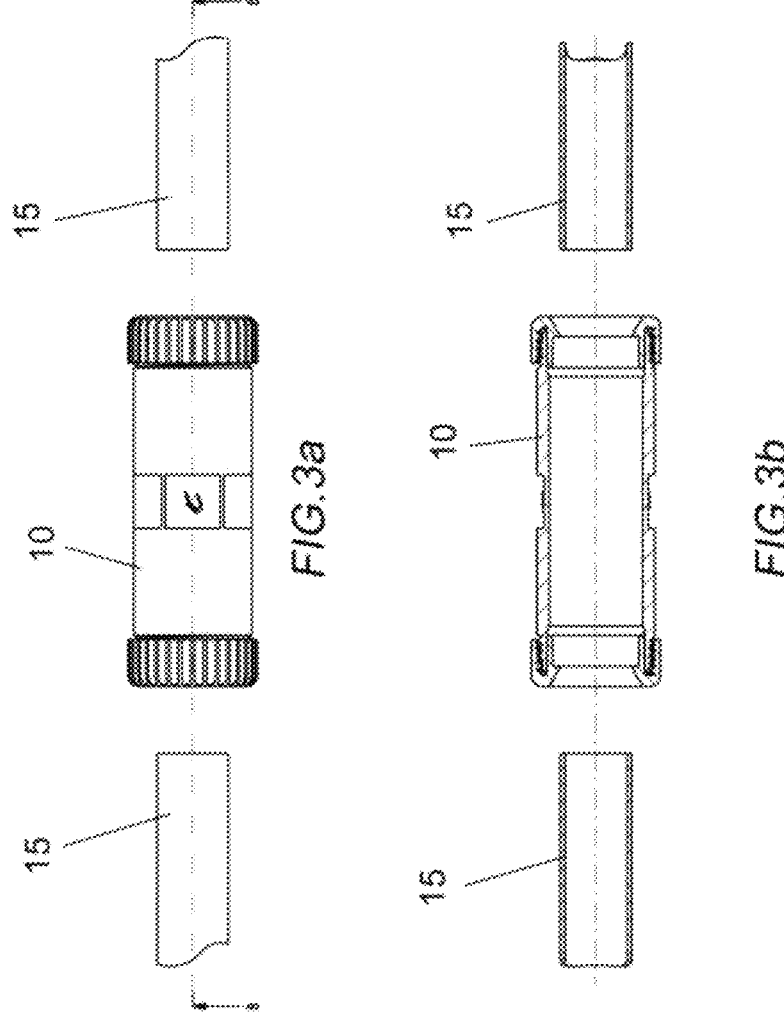

FIGS. 2 to 4 illustrate the phases of mounting of the pipes in the fitting.

Firstly, the ring nut 20 is screwed onto the fitting 10, if necessary tightening it with the tool 4, previously illustrated (FIG. 6), which grips the external knurling 26 of the ring nut, and subsequently the pipe 15 is inserted in the fitting with ring nut (FIGS. 4a, 4b), where it remains firmly locked due to the engagement of the sharp edge 24 therewith.

In fact, any tractions carried out on the pipe increase the gripping of the sharp edge 24 which further locks the pipe.

FIGS. 5a, 5b illustrate two further examples of fittings with ring nuts according to the invention.

The fitting of FIG. 5a has four branches, on each of which a ring nut 20 is placed for the fixing of a corresponding pipe.

The fitting of FIG. 5b is with three branches, on two of which are placed corresponding ring nuts 20 for the fixing of respective pipes, while on the third one a different ring nut 30 is provided, for example for the attachment to a water tap.

Naturally, innumerable configurations and combinations of fittings provided with at least one ring nut 20 are possible, as described above, for the fixing of a pipe 15.

From what has been disclosed, the advantages of the fitting according to the invention, which allows for multiple applications and is of a reusable type, appear clear.

In fact, should it be necessary to remove a pipe 15 inserted in the fitting, it can be extracted by unscrewing the ring nut. If this is not possible because the pipe is stuck in the fitting, it can be cut at the end and then unscrewed from the ring nut, recovering the fitting and the ring nut for subsequent use, with obvious economic advantages.

Naturally, the invention is not limited to the particular embodiment described above and illustrated in the accompanying drawings, but numerous detailed changes may be made thereto, within the reach of the person skilled in the art, without thereby departing from the scope of the invention itself, as defined in the appended claims.

The invention claimed is:

1. A fitting assembly for the passage of a liquid, comprising:
   an internally hollow fitting; and
   a ring nut provided at at least one end of the fitting,
   the ring nut screwing on an external thread of said at least one end of the fitting,
   wherein said ring nut has a cylindrical shape and is integral in a unitary one-piece structure with an internal tubular protrusion, having a slight conicity, which is placed against a beveled or conical section of a wall of an internal cavity of the fitting, creating a seal of the ring nut on the fitting, and
   wherein a conical section is provided inside the ring nut that narrows in a direction of the fitting, creating a sharp edge designed to bite on a pipe of an irrigation system once the pipe is inserted through the ring nut screwed onto the fitting, preventing exiting of the pipe and immovably restraining the pipe;
   the conical section and the fitting being configured to permit the pipe to be inserted into the fitting after the ring nut is fully screwed onto the fitting.

2. The fitting assembly according to claim 1, wherein said ring nut has an external knurling for screwing by a tool provided with a hole with internal protrusions.

3. The fitting assembly according to claim 1, wherein the fitting assembly has a rectilinear tubular shape with both ends externally threaded to receive respective pipes fixed by corresponding ring nuts.

4. A method of immovable fixing of a pipe to a fitting for the transport of a liquid in an irrigation system, comprising:
   screwing a ring nut onto an external thread of at least one end of the fitting; and
   inserting the pipe in said ring nut after the ring nut is fully screwed onto the fitting,
   wherein a conical section is provided inside the ring nut that narrows in a direction of the fitting, creating a sharp edge designed to bite on the pipe once the pipe is inserted through the ring nut screwed onto the fitting, preventing exiting of the pipe and immovably restraining the pipe, and wherein the pipe remains locked through engagement with the sharp edge provided inside the ring nut, suitable for biting on the pipe, the conical section and the fitting being configured to permit the pipe to be inserted into the fitting after the ring nut is fully screwed onto the fitting, and
   wherein said ring nut has a cylindrical shape and is integral in a unitary one-piece structure with an internal tubular protrusion, having a slight conicity, which is placed against a beveled or conical section of a wall of an internal cavity of the fitting, creating a seal of the ring nut on the fitting.

5. The method according to claim 4, wherein the pipe is flexible.

6. The method according to claim 4, wherein the fitting assembly has a rectilinear tubular shape with both ends externally threaded to receive respective pipes fixed by corresponding ring nuts.

\* \* \* \* \*